(12) United States Patent
Kushima

(10) Patent No.: US 7,612,966 B2
(45) Date of Patent: Nov. 3, 2009

(54) HEAD SUSPENSION ASSEMBLY AND RECORDING MEDIUM DRIVE

(75) Inventor: Hiroaki Kushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 11/414,386

(22) Filed: May 1, 2006

(65) Prior Publication Data

US 2007/0188926 A1    Aug. 16, 2007

(30) Foreign Application Priority Data

Feb. 16, 2006    (JP)    ............... 2006-038896

(51) Int. Cl.
    *G11B 5/55*    (2006.01)
(52) U.S. Cl. ............... 360/244.8; 360/244.5; 360/265.9
(58) Field of Classification Search ............. 360/244.2, 360/244.3, 244.4, 244.5, 244.8, 265.9
    See application file for complete search history.

(56) References Cited

U.S. PATENT DOCUMENTS 5,936,803 A * 8/1999 Berding ................ 360/244.8
6,147,839 A * 11/2000 Girard .................... 360/244.8
6,307,715 B1 * 10/2001 Berding et al. ........... 360/244.8
6,466,411 B1 * 10/2002 Kazama .................. 360/244.2
6,667,856 B2 * 12/2003 Danielson et al. ........ 360/244.8
6,956,721 B1 * 10/2005 Khan ...................... 360/244.8
7,075,753 B2 * 7/2006 Wobbe et al. ............ 360/244.2
7,099,116 B1 * 8/2006 Mei ........................ 360/244.8

FOREIGN PATENT DOCUMENTS

JP    11-066766    3/1999
JP    2001-57032   2/2001

* cited by examiner

*Primary Examiner*—Jefferson Evans
(74) *Attorney, Agent, or Firm*—Greer, Burns & Crain, Ltd.

(57) ABSTRACT

A head suspension assembly includes a plate member located at a position distanced from the base. A head slider is supported at the front end of the plate member. A leaf spring connects the rear end of the plate member to the front end of the base. A rib extends at least from the rear end of the plate member toward the front end of the plate member. A restraining piece is located in a space between the rib and the base. When the internal force is induced in the head suspension assembly in response to an impact, the leaf spring receives a force to bend upward to move the head slider upward. The restraining piece serves to avoid any change in the position of the plate member relative to the base. The lead spring is prevented from bending. The plate member is thus reliably prevented from an upward movement.

9 Claims, 5 Drawing Sheets

HEAD SUSPENSION ASSEMBLY AND RECORDING MEDIUM DRIVE

BACKGROUND OF THE INVENTION

1. Field of the Invention

The present invention relates to ahead suspension assembly incorporated in a recording medium drive such as a hard disk drive, HDD.

2. Description of the Prior Art

As disclosed in Japanese Patent Application Publication No. 2001-57032, a head suspension assembly is utilized in a hard disk drive, for example. The head suspension assembly includes a base. A load beam is located in front of the base at a position distanced from the base. A leaf spring serves to connect the rear end of the load beam to the front end of the base. The load beam receives a limiter extending from the front end of the base. A head slider is supported on the front end of the load beam.

When the hard disk drive receives an impact, an inertial force acts on the load beam to bring the head slider at the front end away from the surface of the magnetic recording disk in the hard disk drive. The inertial force causes bend of the leaf spring. Since the rear end of the load beam is simply kept received on the limiter, the bend of the leaf spring leads to a shift of the load beam toward the base. This shift allows the load beam to swing up around the front end of the limiter. The head slider thus cannot sufficiently be prevented from jumping up. The leaf spring then reacts to bring the head slider into a collision against the surface of the magnetic recording disk. The collision may cause damages on the head slider and/or the magnetic recording disk.

SUMMARY OF THE INVENTION

It is accordingly an object of the present invention to provide a head suspension assembly capable of preventing a head slider from jumping up without deformation of a plate member.

According to a first aspect of the present invention, there is provided a head suspension assembly comprising: a base; a plate member located in front of the base at a predetermined interval, the plate member having the front end supporting a head slider; a leaf spring connecting the rear end of the plate member to the front end of the base; a rib extending at least from the rear end of the plate member toward the front end of the plate member; and a restraining piece located in a space between the rib and the base.

The head suspension assembly allows the disposition of a restraining piece in a space between the rib and the base. When the head suspension assembly receives an impact, the inertial force is induced in the head suspension assembly in response to the impact. The leaf spring receives a force to bend upward to move the head slider upward. The restraining piece serves to avoid any change in the position of the plate member relative to the base. The leaf spring is prevented from bending. The plate member is simultaneously prevented from shifting toward the base. The plate member is thus reliably prevented from an upward movement. Collision is avoided between the head slider and a recording medium usually opposed to the head slider. Moreover, the rib serves to provide a sufficient rigidity to bending. The plate member is reliably prevented from bending.

The restraining piece integral to the rib may lead to a facilitated formation of the restraining piece. In this case, the restraining piece may comprises: a first extension continuously connected to the rib and extending toward the base from the rib; and a second extension bending from the first extension so as to define the edge between the first and second extensions, the edge extending from the rib toward the base.

The edge between the first and second extensions serves to reinforce the rigidity of the restraining piece. The restraining piece is allowed to have a sufficient rigidity to bending and buckling. Alternatively, there straining piece may be formed integral with the base.

The head suspension assembly may be incorporated in a recording medium drive such as a hard disk drive, for example. The recording medium drive may comprise: a recording medium; a head slider opposed to the recording medium; a base swinging around a support shaft; a plate member located in front of the base at a predetermined interval, the plate member having the front end supporting the head slider; a leaf spring connecting the rear end of the plate member to the front end of the base; a rib extending at least from the rear end of the plate member toward the front end of the plate member; and a restraining piece located in a space between the rib and the base.

According to a second aspect of the present invention, there is provided a head suspension assembly comprising: a base; a plate member located in front of the base at a predetermined interval, the plate member having the front end supporting a head slider; a leaf spring connecting the rear end of the plate member to the front end of the base; a rib extending at least from the rear end of the plate member toward the front end of the plate member; and a restraining piece continuously connected to the rib, the restraining piece defining a contact surface contacting with the upper surface of the base for sliding movement on the upper surface of the base.

The head suspension assembly allows the contact surface to contact with the upper surface of the base. Friction is generated between the contact surface and the upper surface of the base. When the head suspension assembly receives an impact, the inertial force is induced in the head suspension assembly in response to the impact. The leaf spring receives a force to bend upward to move the head slider upward. The friction serves to prevent the contact surface from sliding on the upper surface of the base. The lead spring is prevented from bending. The plate member is simultaneously prevented from shifting toward the base. The plate member is thus reliably prevented from an upward movement. Collision is avoided between the head slider and a recording medium usually opposed to the head slider. Moreover, the rib serves to provide a sufficient rigidity to bending. The plate member is reliably prevented from bending.

The restraining piece may define an elastic section between the rib and the contact surface. The elastic section is designed to exhibit a force urging the contact surface against the upper surface of the base. Since the elastic section serves to urge the contact surface against the upper surface of the base, a larger friction can be generated between the contact surface and the upper surface of the base.

The head suspension assembly may be incorporated in a recording medium drive such as a hard disk drive, for example. The recording medium drive may comprise: a recording medium; a head slider opposed to the recording medium; a base swinging around a support shaft; a plate member located in front of the base at a predetermined interval, the plate member having the front end supporting the head slider; a leaf spring connecting the rear end of the plate member to the front end of the base; a rib extending at least from the rear end of the plate member toward the front end of the plate member; and a restraining piece continuously connected to the rib, the restraining piece defining a contact surface contacting with the upper surface of the base for sliding movement on the upper surface of the base.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
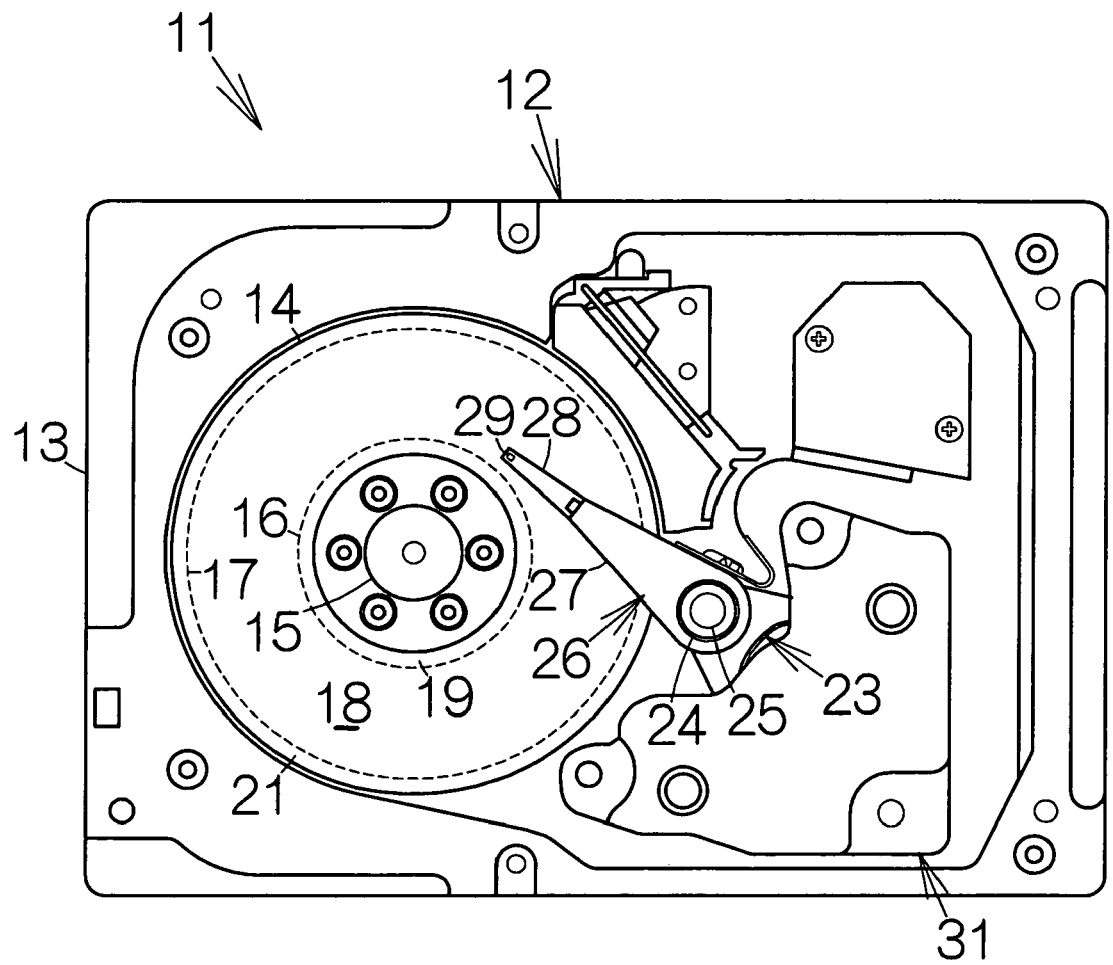
FIG. 1 is a plan view schematically illustrating the inner structure of a hard disk drive, HDD, as an example of a recording medium drive according to the present invention.

FIG. 1 schematically illustrates the inner structure of a hard disk drive, HDD, 11 as an example of a recording medium drive or storage device. The hard disk drive 11 includes an enclosure 12. The enclosure 12 includes an open boxed-shaped base 13 defining an inner space of a flat parallelepiped, for example. The base 13 may be made of a metallic material such as aluminum, for example. Molding process may be employed to form the base 13. A cover, not shown, is coupled to the base 13. The cover closes the opening of the base 13. Pressing process may be employed to form the cover out of a plate material, for example.

At least one magnetic recording disk 14 as a recording medium is located within the inner space of the base 13. The magnetic recording disk or disks 14 is mounted on the driving shaft of a spindle motor 15. The spindle motor 15 drives the magnetic recording disk or disks 14 at a higher revolution speed such as 5,400 rpm, 7,200 rpm, 10,000 rpm, 15,000 rpm, or the like.

A data zone 18 is defined between an innermost recording track 16 and an outermost recording track 17 on the surface of the magnetic recording disk 14. Recording tracks are formed in concentric circles within the data zone 18. Magnetic bit data is recorded onto the recording tracks. A non-data zone 19 is defined inside the innermost recording track 16. A non-data zone 21 is defined outside the outermost recording track 17. No magnetic bit data is recorded onto the non-data zones 19, 21.

A head actuator member, namely a carriage 23 is also located within the inner space of the base 13. The carriage 23 includes a carriage block 24. The carriage block 24 is supported on a vertical support shaft 25 for relative rotation. Head suspension assemblies 26 are attached to the carriage block 24. The head suspension assemblies 26 are designed to extend in the horizontal direction from the vertical support shaft 25. As conventionally known, when two or more magnetic recoding disks 14 are enclosed in the enclosure 12, two head suspension assemblies 26 are located in a space between the adjacent ones of the magnetic recording disks 14. A so-called unamount suspension is employed as the head suspension assemblies 26. A spacer is mounted on the carriage block 24 between the adjacent ones of the head suspension assemblies 26. The carriage block 24 maybe made of an aluminum alloy, for example. Molding process may be employed to form the carriage block 24, for example.

The individual head suspension assembly 26 includes a base or carriage arm 27 supported on the carriage block 24 and a head suspension 28 extending forward from the front end of the carriage arm 27. A flying head slider 29 is fixed to the front end of the head suspension 28. The flying head slider 29 is opposed to the surface of the magnetic recording disk 14.

An electromagnetic transducer, not shown, is mounted on the flying head slider 29. The electromagnetic transducer may include a write element and a read element. The write element may include a thin film magnetic head designed to write magnetic bit data into the magnetic recording disk 14 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example.

A so-called CSS (contact start stop) method is employed in the hard disk drive 11. When the magnetic recording disk 14 stands still, the flying head slider 29 is positioned in the non-data zone 19. The flying head slider 29 is received on the surface of the magnetic recording disk 14. When airflow is generated along the surface of the magnetic recording disk 14 during the rotation of the magnetic recoding disk 14, a positive pressure or lift acts on the flying head slider 29. The flying head slider 29 is thus allowed to fly above the surface of the magnetic recording disk 14. The head suspension 28 exhibits an elastic force to urge the flying head slider 29 toward the surface of the magnetic recording disk 14. The flying head slider 29 is thus allowed to keep flying above the surface of the magnetic recording disk 14 during the rotation of the magnetic recording disk 14 at a higher stability established by the balance between the urging force of the head suspension 28 and the lift.

A power source or voice coil motor, VCM, 31 is coupled to the carriage block 24. The voice coil motor 31 serves to drive the carriage block 24 around the vertical support shaft 25. The rotation of the carriage block 24 allows the carriage arms 27 and the head suspensions 28 to swing. When the carriage arm 27 swings around the vertical support shaft 25, the flying head slider 29 is allowed to move along the radial direction of the magnetic recording disk 14. The electromagnetic transducer on the flying head slider 29 can thus be positioned right above a target recording track on the magnetic recording disk 14.

Figure 2:
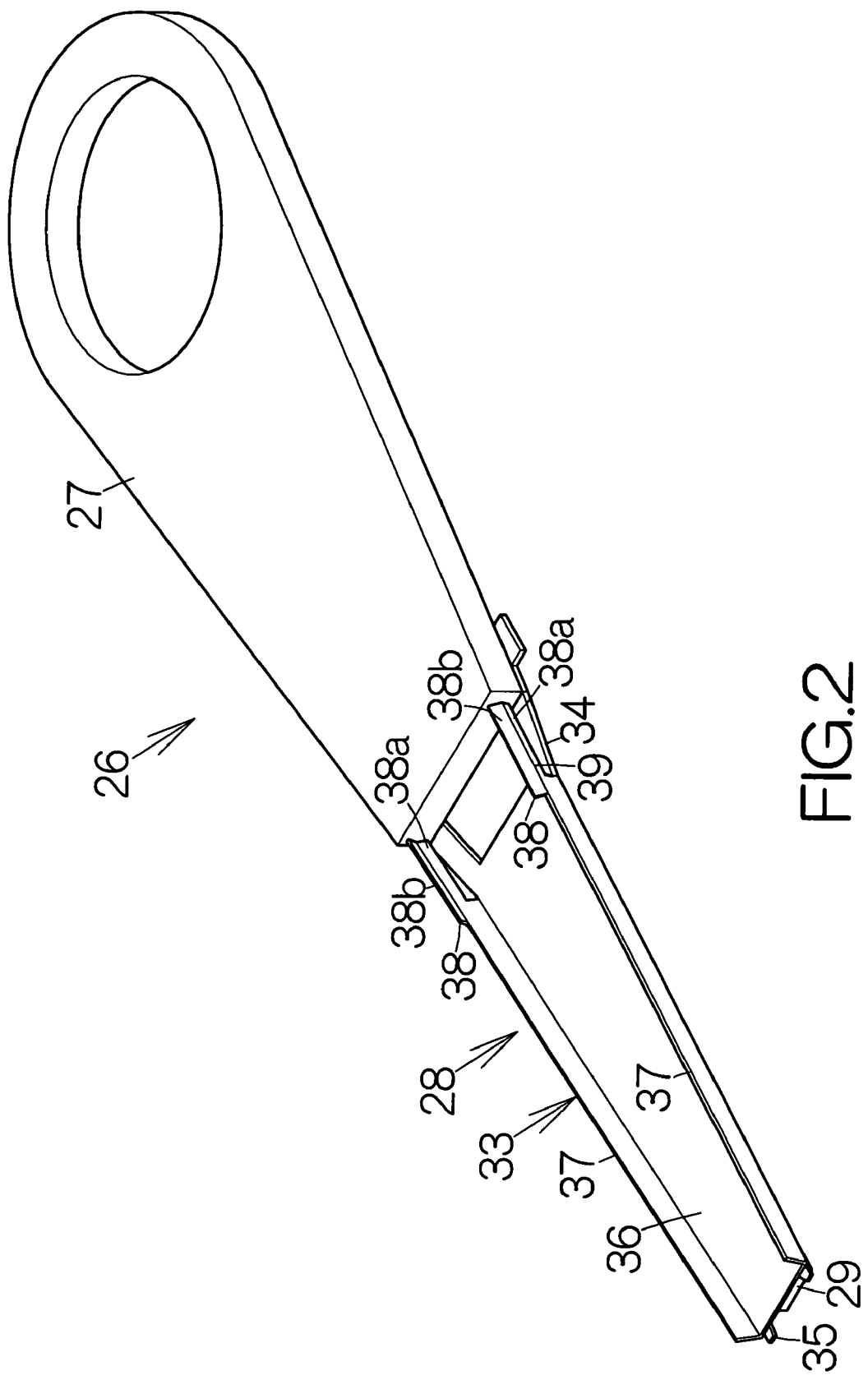
FIG. 2 is an enlarged perspective view schematically illustrating a head suspension assembly according to an embodiment of the present invention.

As shown in FIG. 2, the rear end of the head suspension 28 receives the lower surface of the carriage arm 27. The head suspension 28 is in this manner coupled to the carriage arm 27. The carriage arm 27 may be formed out of a metallic plate such as a stainless steel plate, for example. The head suspension 28 includes a load beam 33 and a leaf spring 34. The load beam 33 is located in front of the carriage arm 27 at a position distanced from the carriage arm 27. The leaf spring 34 serves to connect the rear end of the load beam 33 to the front end of the carriage arm 27. A flexure 35 is fixed to the lower surface of the load beam 33. The flying head slider 29 is fixed to the surface of the flexure 35.

The load beam 33 includes a plate member 36. The plate member 36 is tapered toward the front end of the plate member 36 from the boundary between the load beam 33 and the leaf spring 34. The load beam 33 includes a pair of ribs 37, 37 standing upright from the side edges of the plate member 36.

The ribs 37, 37 are designed to extend from the rear end of the plate member 36 to the front end of the plate member 36. The plate member 36 is thus allowed to extend between the ribs 37, 37. A plate material may be folded to define the ribs 37 at the edges of the plate member 36. Restraining pieces 38, 38 are located between the rear ends of the ribs 37, 37 and the front end of the carriage arm 27, respectively. The restraining pieces 38 are formed integral with the corresponding ribs 37. The restraining pieces 38 are designed to extend from the rear ends of the ribs 37 toward the front end of the carriage arm 27.

The individual restraining piece 38 defines a first extension 38a and a second extension 38b. The first extension 38a is continuously connected to the corresponding rib 37 to extend toward the carriage arm 27. The second extension 38b bends from the first extension 38a to define an edge 39 between the first and second extensions 38a, 38b. The first extension 38a may intersect the second extension 38b at a predetermined inclination angle. Here, the load beam 33, the leaf spring 34, and the restraining pieces 38, 38 may be made of a single leaf spring material such as a stainless steel plate, for example.

As is apparent from FIG. 2, the thickness of the carriage arm 27 may be set significantly larger than the thickness of the load beam 33. The free or rear ends of the restraining pieces 38 are thus allowed to contact with the front end surface of the carriage arm 27. Here, the edges 39 may be set in a direction perpendicular to the front end surface of the carriage arm 27, for example. It is preferable that any gap is avoided between the tip ends of the restraining pieces 38 and the front end of the carriage arm 27.

The leaf spring 34 exhibits an elasticity or flexural force of a predetermined intensity. The flexural force serves to urge the front end of the load beam 33 toward the surface of the magnetic recording disk 14. A domed protrusion, not shown, formed on the lower surface of the plate member 36 contact the back of the flexure 35 so as to urge the flying head slider 29 toward the surface of the magnetic recording disk 14. The domed protrusion allows the flying head slider 29 to change its attitude based on the distribution of a lift under the influence of airflow.

Now, assume that the hard disk drive 11 receives an impact. An inertial force acts on the flying head slider 29 in response to the application of the impact. When the inertial force overcomes the urging force from the leaf spring 34, the flying head slider 29 is forced to jump up from the surface of the magnetic recording disk 14. In this case, the rear ends of the restraining pieces 38, 38 are allowed to contact with the front end surface of the carriage arm 27 as described above, so that the leaf spring 34 is prevented from bending upward. The load beam 33 is simultaneously prevented from shifting toward the carriage arm 27. The plate member 36 or load beam 33 is reliably prevented from swinging upward. The flying head slider 29 is thus reliably kept in contact with the surface of the magnetic recording disk 14. This results in a reliable prevention of collision between the flying head slider 29 and the magnetic recording disk 14.

In addition, the ribs 37 integral to the restraining pieces 38 provide the plate member 36 with a sufficient rigidity to bending. The plate member 36 is thus reliably prevented from bending. Furthermore, the edge 39 is set perpendicular to the front end surface of the carriage arm 27. This structure contributes to an improvement in the rigidity to buckling in the restraining pieces 38. The restraining pieces 38 have a sufficient rigidity to buckling. The restraining pieces 38 reliably prevent the leaf spring 34 from bending.

Figure 3:
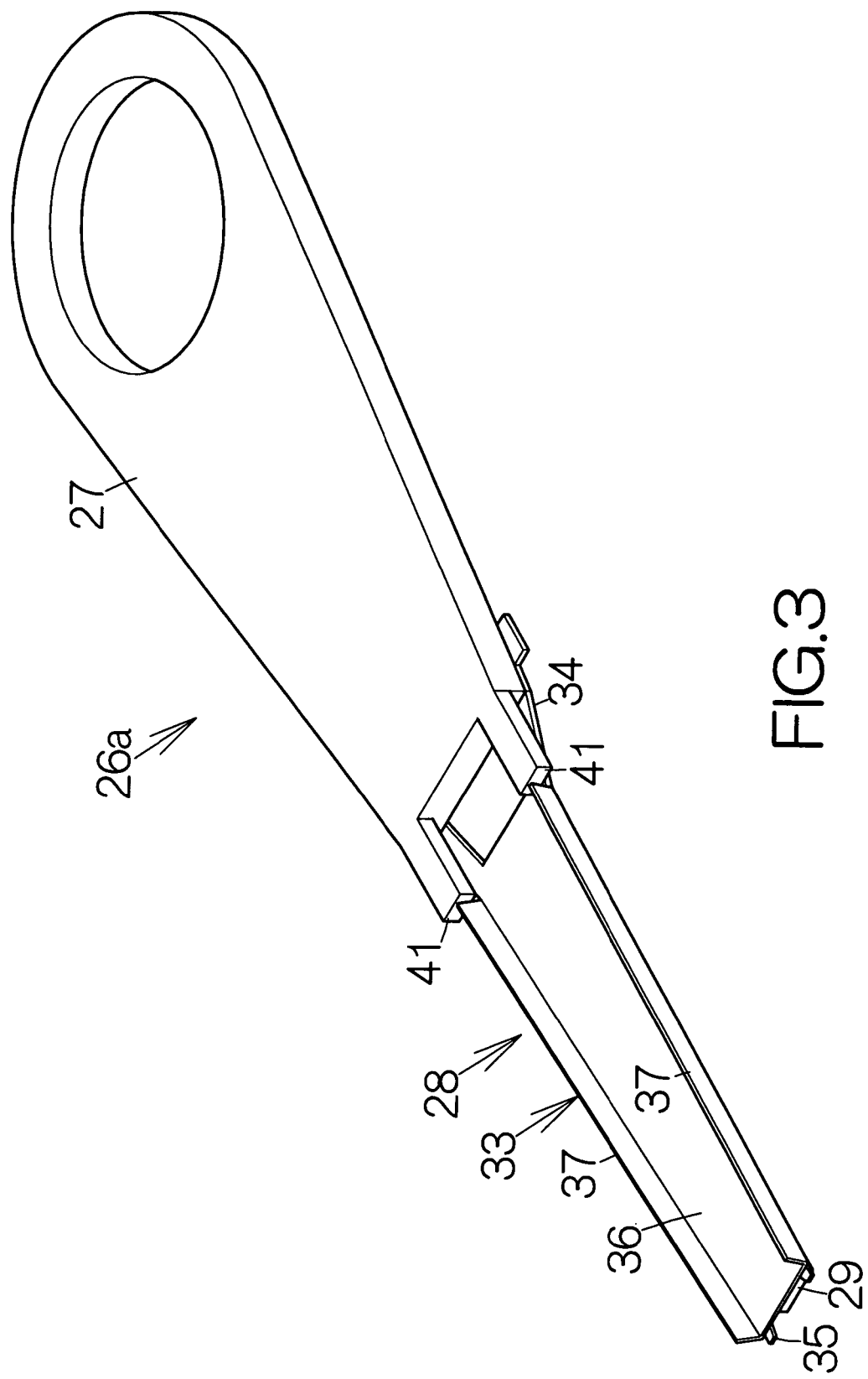
FIG. 3 is an enlarged perspective view schematically illustrating a head suspension assembly according to a modification to the embodiment of the present invention.

As shown in FIG. 3, the hard disk drive 11 may allow replacement of the head suspension assembly 26 with a head suspension assembly 26a, for example. Restraining pieces 41 are continuously connected to the carriage arm 27 between the ribs 37, 37 and the carriage arm 27. The restraining piece 41 is designed to extend from the front end of the carriage arm 27 to a position adjacent to the rear end of the rib 37. The front end of the individual restraining piece 41 contacts with the rear end of the corresponding rib 37. Like reference numerals are attached to structure and components equivalent to those of the aforementioned embodiment.

When the inertial force overcomes the urging force from the leaf spring 34, the flying head slider 29 is forced to jump up from the surface of the magnetic recording disk 14 in the same manner as described above. The front ends of the restraining pieces 41 receive the rear ends of the ribs 37, so that the leaf spring 34 is prevented from bending upward. The load beam 33 is simultaneously prevented from shifting toward the carriage arm 27. The plate member 36 or load beam 33 is thus reliably prevented from swinging upward. The flying head slider 29 is thus reliably kept in contact with the surface of the magnetic recording disk 14. This results in a reliable prevention of collision between the flying head slider 29 and the magnetic recording disk 14.

The ribs 37 provide the plate member 36 with a sufficient rigidity to bending. The plate member 36 is thus reliably prevented from bending. The restraining pieces 41 are allowed to have a sufficient thickness. The restraining pieces 41 are thus provided with a sufficient rigidity. The restraining pieces 41 reliably prevent the leaf spring 34 from bending.

Figure 4:
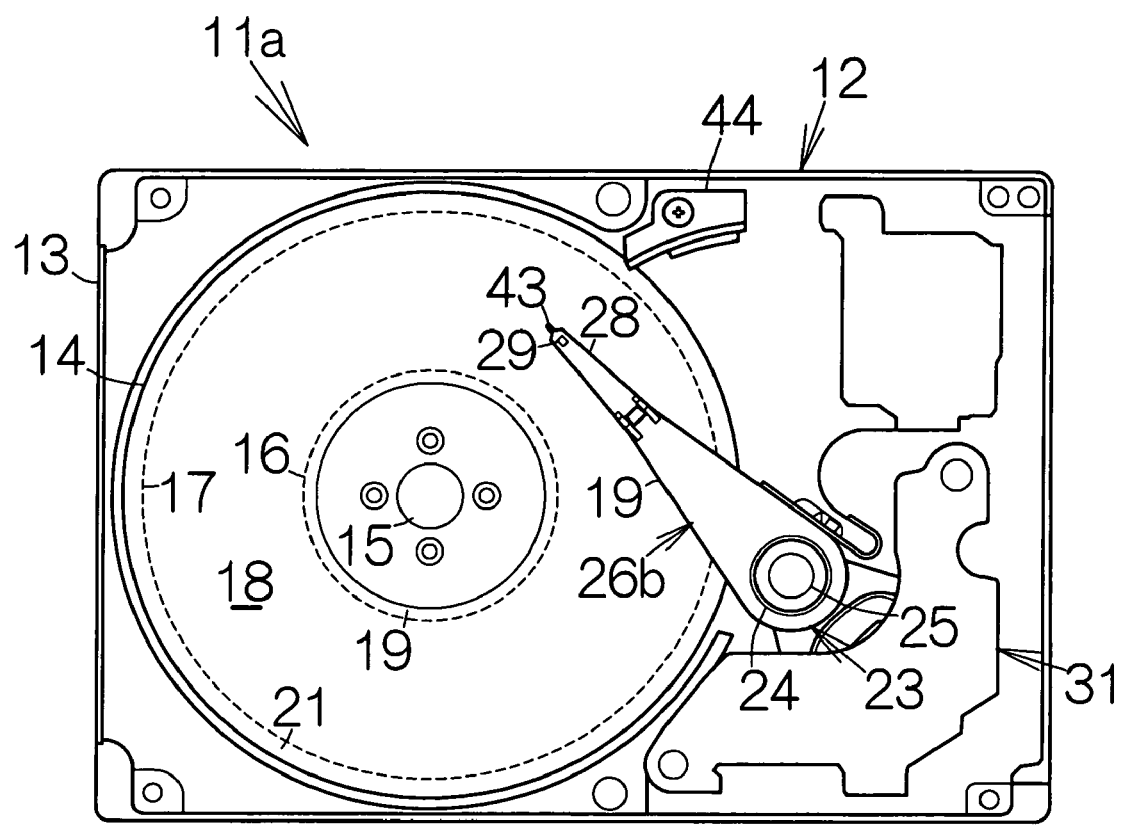
FIG. 4 is a plan view schematically illustrating the inner structure of a hard disk drive, HDD, according to another embodiment of the present invention.

FIG. 4 schematically illustrates the inner structure of a hard disk drive 11a as another example of a recording medium drive or storage device of the present invention. A so-called load/unload method is employed in the hard disk drive 11a. Head suspension assemblies 26b are incorporated in the hard disk drive 11a. The individual head suspension assembly 26b includes a load tab 43 at the tip end of the head suspension 28. The load tab 43 is designed to extend forward from the front end of the head suspension 28. The swinging movement of the head suspension assembly 26b allows the load tab 43 to move along the radial direction of the magnetic recording disk 14.

A ramp member 44 is located on the movement path of the load tab 43 in a space outside the magnetic recording disk 14. The ramp member 44 has the tip end extending beyond the outer periphery of the magnetic recording disk 14, so that the tip end of the ramp member 44 is opposed to the non-data zone 21 outside the outermost recording track 17 on the magnetic recording disk 14. When the magnetic recording disk 14 stands still, the load tab 43 is received on the ramp member 44. The combination of the ramp member 44 and the load tab 43 establishes a so-called load/unload mechanism. The ramp member 44 may be made of a hard plastic material, for example. Like reference numerals are attached to structure and components equivalent to those of the aforementioned embodiment.

Figure 5:
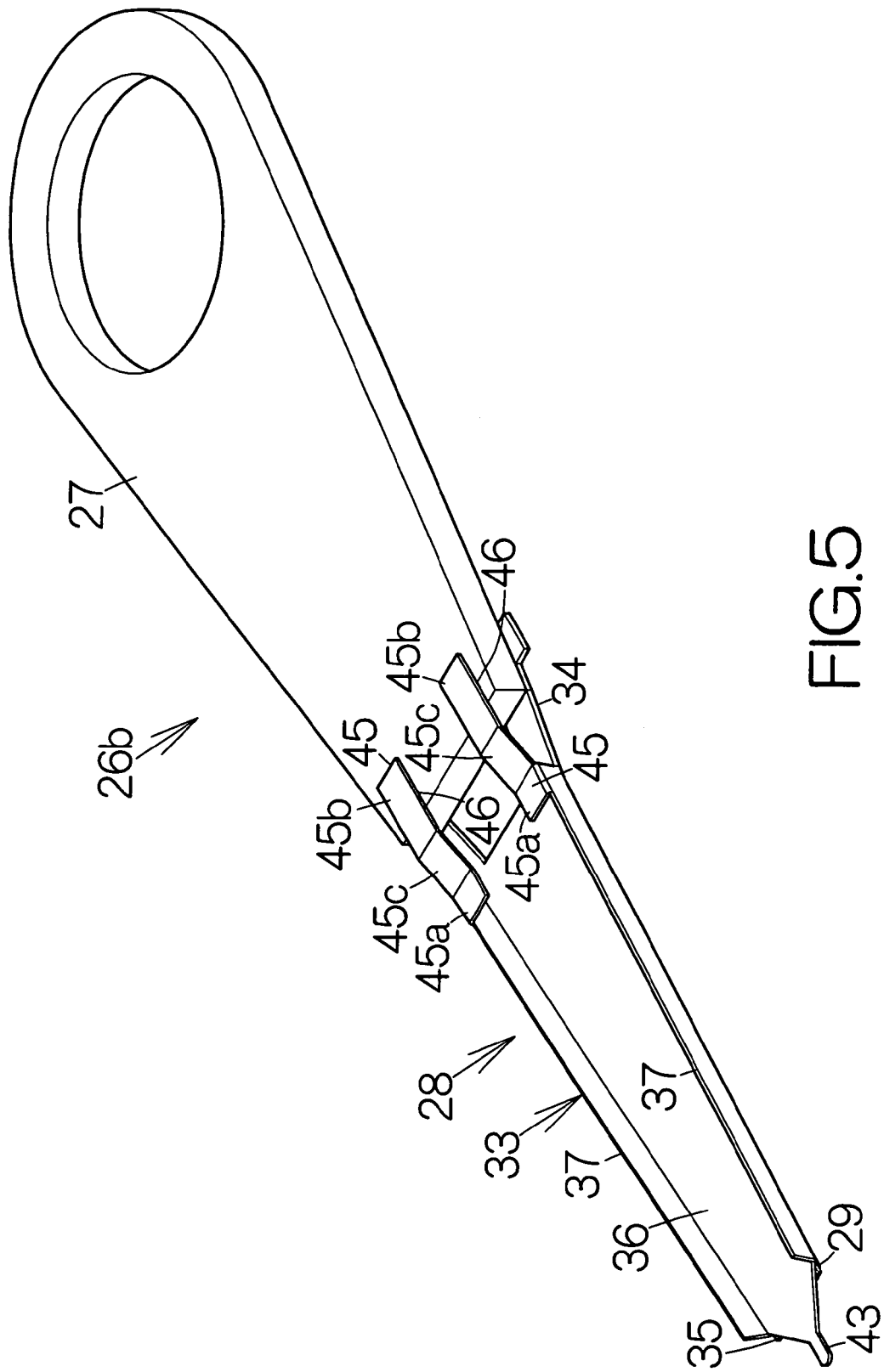
FIG. 5 is an enlarged perspective view schematically illustrating a head suspension assembly according to another embodiment of the present invention.

As shown in FIG. 5, restraining pieces 45, 45 are located between the ribs 37, 37 and the carriage arm 27 in the head suspension assembly 26b. The individual restraining piece 45 extends between the upper edge of the corresponding rib 37 and the upper surface of the carriage arm 27. The restraining piece 45 is formed integral with the rib 37. The restraining piece 45 is opposed to the leaf spring 34. The front end of the carriage arm 27 is thus interposed between the restraining pieces 45 and the leaf spring 34. Here, the load beam 33, the leaf spring 34, the ribs 37, 37 and the restraining pieces 45, 45 may be made of a single leaf spring material such as a stainless steel plate, for example.

The individual restraining piece 45 includes a base piece 45a, a contact piece 45b and an elastic section 45c. The base piece 45a is continuously connected to the upper edge of the rib 37. The base piece 45a bends from the rib 37 at right angles. The contact piece 45b extends at a position distanced from the base piece 45a. The contact piece 45b is received on the upper surface of the carriage arm 27. The elastic section 45c serves to connect the contact piece 45b to the base piece 45a. A contact surface 46 is defined in the lower surface of the contact piece 45b. The upper surface of the carriage arm 27 receives the contact surface 46 of the contact piece 45b. The elastic section 45c generates an urging force for urging the contact piece 45b against the upper surface of the carriage arm 27. Like reference numerals are attached to structure and components equivalent to those of the aforementioned embodiment.

When the inertial force overcomes the urging force from the leaf spring 34, the flying head slider 29 is forced to jump up from the surface of the magnetic recording disk 14 in the same manner as described above. In this case, the elastic section 45c keeps urging the contact piece 45b against the upper surface of the carriage arm 27. Friction is generated between the contact surface 46 and the upper surface of the carriage arm 27. The contact piece 45b hardly slides along the upper surface of the carriage arm 27 toward the rear end of the carriage arm 27. In this manner, the friction serves to prevent the leaf spring 34 from bending. The load beam 33 is simultaneously prevented from shifting toward the carriage arm 27. The load beam 33 is thus reliably prevented from swinging upward. The flying head slider 29 is reliably kept in contact with the surface of the magnetic recording disk 14. This results in a reliable prevention of collision between the flying head slider 29 and the magnetic recording disk 14.

The head suspension assembly 26b reacts to the inertial force to bring the flying head slider 29 in contact with the surface of the magnetic recording disk 14. The friction serves to prevent the contact pieces 45b to slide on the upper surface of the carriage arm 27 toward the front end of the carriage arm 27. The friction serves to prevent the leaf spring 34 from bending to the utmost. This leads to a reduction in the moving speed of the flying head slider 29 toward the surface of the magnetic recording disk 14. Collision is thus minimized between the flying head slider 29 and the magnetic recording disk 14. The ribs 37 provide the plate member 36 with a sufficient rigidity to bending in the aforementioned manner. The plate member 36, namely the load beam 33 is thus reliably prevented from bending.

Asperity may be provided on the upper surface of the carriage arm 27 and the contact surface 46 based on a surface treatment, for example. The asperity serves to enhance the friction between the upper surface of the carriage arm 27 and the contact surface 46. Alternatively, an elastic resin film such as a polyimide resin film may be formed to cover over the upper surface of the carriage arm 27 and the contact surface 46, for example. The elastic resin film serves to enhance the friction between the upper surface of the carriage arm 27 and the contact surface 46.

What is claimed is:

1. A head suspension assembly comprising:
   a base;
   a plate member located in front of the base at a predetermined interval, said plate member having a front end supporting a head slider;
   a leaf spring connecting a rear end of the plate member to a front end of the base;
   a rib extending at least from the rear end of the plate member toward a front end of the plate member; and
   a restraining piece located in a space between the rib and the base at a position spaced from the leaf spring,
   wherein the restraining piece includes an extension extending from one of the rear end of the rib and the front end of the base toward other of the rear end of the rib and the front end of the base.

2. The head suspension assembly according to claim 1, wherein the restraining piece is formed integral with the rib.

3. The head suspension assembly according to claim 1, wherein the restraining piece is formed integral with the base.

4. A head suspension assembly comprising:
   a base;
   a plate member located in front of the base at a predetermined interval, said plate member having a front end supporting a head slider;
   a leaf spring connecting a rear end of the plate member to a front end of the base;
   a rib extending at least from the rear end of the plate member toward a front end of the plate member; and
   a restraining niece located in a space between the rib and the base at a position spaced from the leaf spring,
   wherein the restraining piece comprises:
   a first extension continuously connected to the rib and extending toward the base from the rib; and
   a second extension bending from the first extension so as to define an edge between the first and second extensions, the edge extending from the rib toward the base.

5. The head suspension assembly according to claim 4, wherein the restraining piece is formed integral with the rib.

6. A head suspension assembly comprising:
   a base;
   a plate member located in front of the base at a predetermined interval, said plate member having a front end supporting a head slider;
   a leaf spring connecting a rear end of the plate member to a front end of the base;
   a rib extending at least from the rear end of the plate member toward a front end of the plate member; and
   a restraining piece continuously connected to the rib, the restraining piece defining a contact surface contacting with an upper surface of the base for sliding movement on the upper surface of the base.

7. The head suspension assembly according to claim 6, wherein the restraining piece defines an elastic section between the rib and the contact surface, said elastic section exhibiting a force urging the contact surface against the upper surface of the base.

8. A recording medium drive comprising:
   a recording medium;
   a head slider opposed to the recording medium;
   a base swinging around a support shaft;
   a plate member located in front of the base at a predetermined interval, said plate member having a front end supporting the head slider;
   a leaf spring connecting a rear end of the plate member to a front end of the base;
   a rib extending at least from the rear end of the plate member toward a front end of the plate member; and
   a restraining piece located in a space between the rib and the base at a position spaced from the leaf spring,
   wherein the restraining niece includes an extension extending from one of the rear end of the rib and the front end of the base toward other of the rear end of the rib and the front end of the base.

9. A recording medium drive comprising:
   a recording medium;
   a head slider opposed to the recording medium;
   a base swinging around a support shaft;

a plate member located in front of the base at a predetermined interval, said plate member having a front end supporting the head slider;

a leaf spring connecting a rear end of the plate member to a front end of the base;

a rib extending at least from the rear end of the plate member toward a front end of the plate member; and a restraining piece continuously connected to the rib, the restraining piece defining a contact surface contacting with an upper surface of the base for sliding movement on the upper surface of the base.

* * * * *